(12) United States Patent
Fairbourn

(10) Patent No.: US 6,509,101 B2
(45) Date of Patent: Jan. 21, 2003

(54) SILANE COATING FOR COOKING UTENSILS

(75) Inventor: David C. Fairbourn, Sandy, UT (US)

(73) Assignee: Aeromet Technologies, Sandy, UT (US)

( * ) Notice: Subject to any disclaimer, the term of this patent is extended or adjusted under 35 U.S.C. 154(b) by 0 days.

(21) Appl. No.: 09/736,746

(22) Filed: Dec. 14, 2000

(65) Prior Publication Data

US 2002/0076565 A1 Jun. 20, 2002

(51) Int. Cl.[7] .............................................. B32B 15/08
(52) U.S. Cl. .................... 428/447; 428/448; 428/450; 427/140; 427/142; 427/318; 427/387; 106/14.14; 106/14.21
(58) Field of Search ................... 428/447, 450, 428/448; 427/387, 140, 142, 318; 106/14.14, 14.21

(56) References Cited

U.S. PATENT DOCUMENTS

| 4,066,817 | A | | 1/1978 | De Rossi | |
|---|---|---|---|---|---|
| 4,238,050 | A | * | 12/1980 | LeGrow | 220/458 |
| 4,677,147 | A | | 6/1987 | Swihart et al. | |
| 5,750,197 | A | | 5/1998 | van Ooji et al. | |
| 6,054,522 | A | | 4/2000 | Carre et al. | |
| 6,270,884 | B1 | * | 8/2001 | Guhde et al. | 428/323 |
| 2001/0032568 | A1 | * | 10/2001 | Schutt | 106/287.11 |

FOREIGN PATENT DOCUMENTS

WO   PCT/US99/30978   7/2000

* cited by examiner

*Primary Examiner*—Robert Dawson
*Assistant Examiner*—Christopher Keehan
(74) *Attorney, Agent, or Firm*—Wood Herron & Evans, LLP

(57) ABSTRACT

A silane coating (32) is provided which affords non-stick properties to a metal surface (20, 22) of a cooking utensil (10) and which can be provided with colorant (42) to impart a stable color appearance, including white, to the utensil (10). An easy repair method is also described.

32 Claims, 1 Drawing Sheet

SILANE COATING FOR COOKING UTENSILS

BACKGROUND OF THE INVENTION

I. Field of the Invention

The present inventions relates to cooking utensils and, more particularly, to coating of a metal surface of the cooking utensils.

II. Description of Prior Art

During food preparation such as cooking, food has a tendency to stick to the surface of the cooking utensils, such as pots, pans, stoves, ovens, spatulas, and the like. When food sticks to the cooking utensil, the preparation of the food becomes more difficult, as does clean up thereafter. The typical approach to resolve such difficulties has been to treat or coat the surface of the cooking utensil in such a way as to impart more or less permanent non-stick properties thereto. Such efforts have met with commercial success but are in need of further improvement.

By way of example, one purportedly non-stick coating is provided with aluminum-based cooking utensils by hard anodizing the surface so as to build up an aluminum oxide layer thereon. That oxide layer reduces the tendency of the food to stick to the metal surface of the cooking utensil. However, the surface is still considered somewhat "sticky" meaning that an even slippier surface is desired. A further drawback to the hard anodized surface is the recognized inability to provide a white-colored surface to the cooking utensil. White coloration is desired by many making the hard anodized cooking utensil less desirable from a commercial perspective. Additionally, while various other colors are possible, exposure of the hard anodized surface to cooking heat, can cause the surface to become charred or discolored.

Another non-stick coating is provided by applying a layer of polytetraflouroethylene, i.e., Teflon® material, to the surface of the cooking utensil. The Teflon® coating is considered by some to be better than the hard anodized coating because it is slippier. There is thus less of a tendency for food to stick to the Teflon®-coated cooking utensil than the hard anodized cooking utensil. A significant drawback to the Teflon® coating, however, is that it tends to scratch or abrade thereby diminishing the non-stick behavior of the cooking utensil. The non-stick properties of Teflon® coated cooking utensils, once diminished or lost, such as from being scratched or abraded, may not be readily repaired.

Another non-stick coating is discussed in U.S. Pat. No. 4,677,147, which involves the reaction of four components, i.e., thermostable polyorganosiloxane resin, a nonthermostable polyorganosiloxane resin, and two different metal salts of carboxylicacids. The need to use two different varieties of siloxane, and the metals, introduces cost and complexity. Silane coatings for glassware is described in U.S. Pat. No. 6,054,522.

SUMMARY OF THE INVENTION

The present invention provides improved coatings for cooking utensils which is simpler than a multi-siloxane and metal reaction coating, imparts advantageous non-stick properties to the cooking utensil metal surface that are better than the hard anodized surface, and which may be readily repaired if scratched or abraded. To this end, and in accordance with the principles of the present invention, the surface of the cooking utensil is coated with an aqueous/ alcohol silane solution which is then heated to form a more or less permanent, coating thereon. The resulting coating is thus easily applied to afford advantageous non-stick properties.

The silane solution may advantageously be comprised of components which when heated to temperatures commonly encountered in cooking food will form the coating. As a consequence, if the coating becomes scratched or abraded, it may be refurbished or renewed simply by applying an additional amount of the silane solution and heating same in a kitchen oven, for example. Such a procedure may be carried out at home by the consumer who may be provided with a quantity of the silane solution. Still further, the silane solution may advantageously contain only one variety of silane which is not reacted with any other variety of silane or non-native metals in order to be applied to, and form the coating on, the surface. It is contemplated that the silane reacts with the metal surface to form the non-stick coating. The silane is a trialkoxyalkane silane. One such solution includes only Bis(triethoxysilyl) ethane (BTSE) or Bis (trimethoxylsilyl) methane (BTSM).

The silane solution may also advantageously be provided with a colorant to impart visibly perceptible color to the coated surface. The colorant may include a white colorant to thereby impart a white surface to the cooking utensil. The coating formed by the silane solution is also resistant to charring or discoloring from heat and so can provide a stable color to the surface of the cooking utensil. Still further, the surface may be hard anodized prior to application of the silane solution to thereby create a coating over the hard anodized surface. The resulting coating provides advantageous non-stick properties, as well as a color stable appearance. The coating would also provide a sealant for the anodized aluminum coating.

By virtue of the foregoing, there is thus provided improved coatings for cooking utensils which is simpler than a multi-siloxane and metal reaction coating, imparts advantageous non-stick properties to the cooking utensil, and which may be easily repaired if scratched or abraded. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE DRAWINGS

Figure 1:
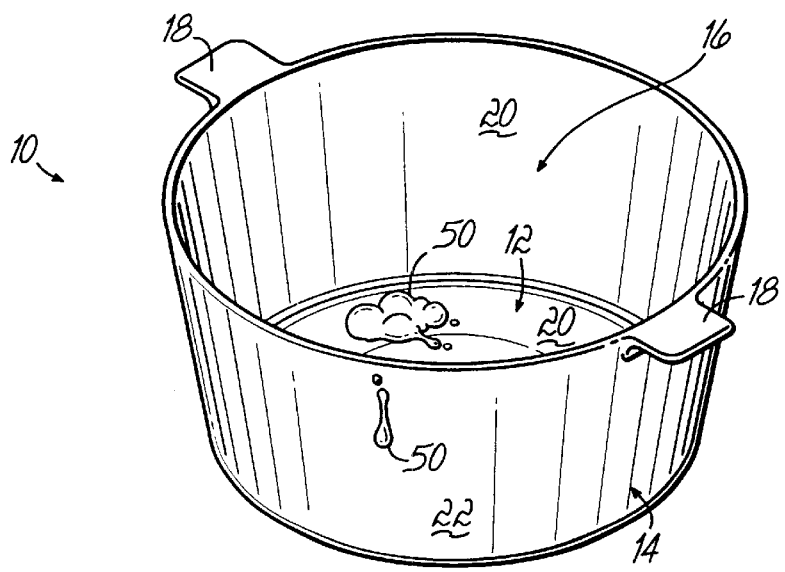
FIG. 1 is a perspective view of an exemplary cooking utensil to which may be applied a silane coating in accordance with the principles of the present invention.
Figure 2:
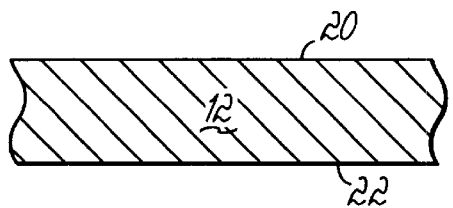
FIG. 2 is a cross-sectional view of a wall of a cooking utensil, such as that of FIG. 1, prior to coating with the silane.

The present invention is applicable to the metal surface of cooking utensils, such as pots, pans, ovens, stoves, spatulas or the like. For purposes of explaining the principles of the present invention, reference will be made to a pot as an exemplary cooking utensil, it being understood however, that the reference is merely for purposes of explanation and not limitation. To this end, and with reference to FIG. 1, there is shown in perspective view a metal pot 10. The pot can be formed from any metal typically used in cooking including iron, steel, titanium, stainless steel, copper and aluminum as well as alloys thereof. Pot 10 has a bottom wall 12 and a peripheral sidewall 14 extending from the bottom wall 12 to define the pot interior 16. Pot 10 may further include one or more handles 18 mounted to sidewall 14. Walls 12 and 14 are comprised of relatively high heat conducting metal, such as aluminum or wrought aluminum, although other metals such as stainless steel or iron may be used depending upon the type or intended use of the cooking utensil. As can be seen with reference to FIG. 2, each wall 12, 14 (only wall 12 is shown for sake of simplicity) has a first surface 20 and a second, opposite surface 22. Surface 20 may face interior 16 and so is adapted to receive food thereon, while surface 22 may face outwardly from interior 16 and directly receive heat from a heating source (not shown) such as a burner or oven.

Figure 3:
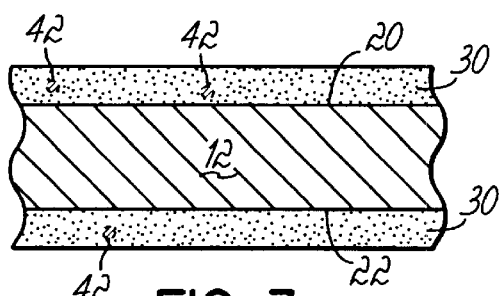
FIG. 3 is a view like that of FIG. 2 showing application of the silane coating thereto.
Figure 4:
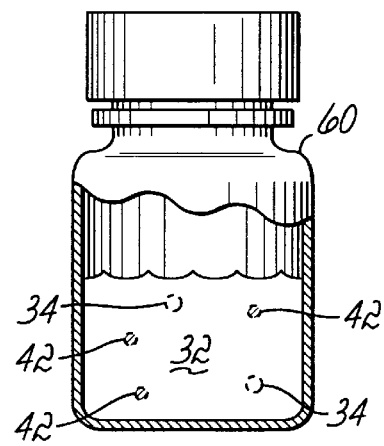
FIG. 4 is a representative view of a container of silane solution for use in the present invention.
Figure 5:
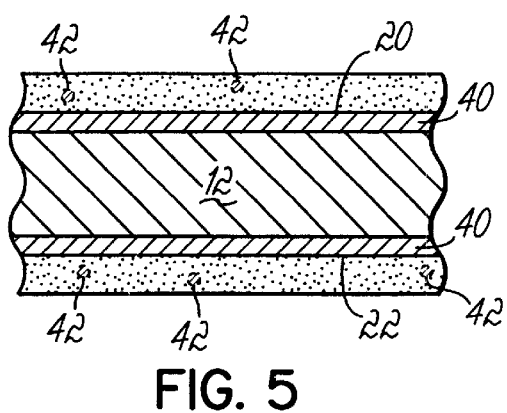
FIG. 5 is a view like that of FIG. 3 further showing a hard anodized surface on the wall of the cooking utensil.

In accordance with the principles of the present invention, one or both of surfaces 20, 22 is to be provided with a silane coating 30, as indicated in FIG. 3. To this end, a silane solution 32 (FIG. 4) is provided. Solution 32 is applied in its liquid or solution form directly to surface 20 and/or surface 22 such as by spraying, dipping or painting thereon, by way of example. The silane solution 32 is then heated to cause the solution to form the hard coating 30. The silane solution 32 may be applied directly to the surface 20 or 22 of the wall and then heated to form the coating. Alternatively, if the pot is aluminum, the surface may first be hard anodized as at 40 and the silane solution 32 then applied to the hard anodized surface 40 to form the coating 30 thereon as indicated in FIG. 5. The hard anodized process may be particularly helpful where the metal making up the wall and/or its surface is aluminum or a wrought alloy of aluminum, such as aluminum 1100 or aluminum 3003.

The result of coating 30 is that the surface(s) 20,22 are provided with a more or less permanent, and desirably slippery, non-stick silane coating that has better non-stick properties than is believed to be provided by the hard anodized coating, for example. Additionally, the silane solution 32 may be comprised of materials that form the coating at temperatures readily encountered in the normal cooking process. As a consequence, should coating 30 be scratched or abraded, the non-stick properties may be readily and easily refurbished or renewed merely by application of a further quantity of the silane solution 32 to the cooking utensil 10 and heating in a conventional kitchen oven (not shown). Thus, consumers may easily extend the useful life of the cooking utensil 10, a result not readily achievable with Teflon®-coated cooking utensils.

The silane suitable for use in the present invention will have mono bis or tri functional trialkoxyalkane silane. Preferably the silane is a bifunctional trialkoxy silyl, preferably trimethoxy or triethoxy silyl groups. Bisfunctional silane compounds are well known and two preferred for use in the present invention are bis(triethoxysilyl) ethane and bis(trimethoxysilyl) methane. In both of these compounds the bridging group between the two silane moieties is an alkyl group.

Additional commercially available silanes include:
1,2-Bis(tetramethyldisoloxanyl) Ethane
1,9-Bis(triethoxysilyl) Nonane
Bis(triethoxysilyl) Octane
Bis(trimethoxysilyl Ethane
1,3-Bis(trimethylsiloxy)-1,3-Dimethyl Disiloxane
Bis(trimethylsiloxy) Ethylsilane
Bis(trimethylsiloxy) Methylsilane This silane is applied as an aqueous/alcohol solvent solution. The solvent solution will contain from about 1–2% to about 30% water with the remainder being a lower alcohol such as methanol, ethanol, propanol or the like. Ethanol and methanol are preferred. The solvent is combined with the silane and generally acetic acids to establish a pH of about 4–6. The concentration of the silane compound is not relevant as long as the silane remains in solution during application. Generally, the solution will have about 1% to about 20% silane by weight.

One silane solution 32 may be formed of a single variety of silane 34 (FIG. 4), such as an organofunctional silane such as BTSE 1,2 bis(triethoxysilyl)ethane or BTSM 1,2 bis(trimethoxysilyl)methane. The silane may be dissolved in a mixture of water and acetic acid at a pH of 4, then in denatured alcohol to establish the silane solution 32. The solution has about 10 ml of ultra-high purity distilled, de-ionized, RO water, 190 ml of denatured alcohol (mixture of ethanol and isoproponol, N.O.S.) and glacial acetic acid with approximately 10 ml of the BTSE obtained from Alldridge Chemical. Silane concentration is at least 5% and more advantageously 10 to 15%. This readily forms the more or less permanent coating 30 at temperatures normally encountered in cooking food.

The silane solution 32 is applied liberally and any excess is poured off. The pot and coating are then heated, such as in a conventional oven, to about 250° F. for about 25 minutes to form coating 30. Prior to the heating, the solution may first be allowed to dry on the surface 20, 22, such as underneath a lamp (not shown). Heating of the solution to form coating 30 may be accomplished by heat treating pot 10 with the silane solution on surfaces 20, 22. Generally, formed coating 30 will be 0.01 to 2.0 g/cm² of cooking surface.

In accordance with a further feature of the present invention, coating 30 may present a desirable color appearance to the cooking utensil 10. To this end, the solution containing the silane may further include a colorant 42 (FIG. 4). Colorant 42 is advantageously an inert particulate colorant in sufficient concentration to cause the coating 30 to take on a visibly perceptible color. Where a white is desired, the colorant may be $TiO_2$ particles. Where a chocolate brown color is desired, the colorant may be $Fe_2O_3$ or $Fe_3O_4$ particles. The coating 30 with colorant 42 therein (FIGS. 4 and 5) thus provides a stably colored appearance to surface 20 or surface 22 that is not prone to charring or discoloration.

In use, solution 32, with a colorant 42 if desired, is applied to those portions or all of surface 20 and/or 22 of cooking utensil desired to be coated, and then heated to form a hard polyorganosilane coating 30. Cooking utensil 10, with silane coating 30 may be used for handling food such as cooking by exposing the surface 20 or 22 to foodstuffs 50 (FIG. 1) which may be easily moved across the surface and/or wiped therefrom due to the non-stick properties provided by the polyorganosilane coating 30 to thus facilitate cooking with and/or cleaning of utensil 10. Also, if provided with a colored coating 30, the surface will tend to retain the color during the cooking process rather than char or discolor. Should the coating 30 chip or abrade or otherwise become damaged or lose coloration or non-stick properties, the coating 30 in that portion or all of utensil 10 may be readily repaired. To this end, the user (not shown) may be provided with a quantity, such as in a sealed bottle 60 (FIG. 4) of solution 32. Solution 32 in bottle 60 may also contain appropriate colorant 42, if necessary. The user takes the quantity of solution and applies some from bottle 60 to the portion(s) of utensil 10 to be repaired, such as by brushing solution 32 onto utensil 10 or dipping utensil 10 into a bath of solution 32, and thereafter heating the utensil, such as in a conventional kitchen oven (not shown) at about 250° F. for about 25 minutes to reform coating 30 on at least those portion(s) of utensil 10. Prior to heating, it may be advantageous to allow the solution 32 to dry on utensil 10.

By virtue of the foregoing, there is thus provided improved coatings for cooking utensils which is simpler than a multi-siloxane and metal reaction coating, imparts advantageous non-stick properties to the cooking utensil, and which may be easily repaired if scratched or abraded.

While the present invention has been illustrated by the description of embodiments thereof and while the embodiments have been described in considerable detail, it is not intended to restrict or in any way limit the scope of the appended claims to such detail. Additional advantages and modifications will readily appear to those skilled in the art. For example, while the wall of some cooking utensils, such as pots and pans, is thick and continuous, the wall of other utensils, such as a spatula, may be thin and/or discontinuous. Thus, as used herein, "wall" may refer to a portion of the utensil that is adapted to receive or otherwise contain food and/or to receive heat to be communicated to food. Moreover, while the wall, and thus its surface, may be a single-ply of metal, the wall may be multi-ply in that the surface 20 or 22 may be metal supported on either a different metal or some other web of material. Also, while aluminum is the metal of pot 10 described herein, other metals, such as stainless steel or iron may form surface 20 or 22. When stainless steel is used, the surface may first need to have a sticky coating applied, such as cross-linked set of silanes, onto which a silane coating of the present invention may be formed. The invention in its broader aspect is, therefore, not limited to the specific details, representative apparatus, and method, and the illustrative examples shown and described. Accordingly, departures may be made from such details without departing from the spirit or scope of the general inventive concept.

Having described the invention, what is claimed is:

1. A metal appliance comprising:
    a cooking utensil having a wall with a metal surface, the wall adapted to be exposed to cooking heat in use of the cooking utensil with foodstuffs; and
    a non-stick coating on said surface, the coating comprising a trialkoxyalkane silane adapted to prevent sticking of foodstuffs thereon.
2. The cooking utensil of claim 1, wherein said metal surface is selected from group consisting of aluminum and aluminum alloys.
3. The cooking utensil of claim 2, said surface is hard anodized.
4. The cooking utensil of claim 1, the metal surface being comprised of a wrought alloy.
5. The cooking utensil of claim 4, the wrought alloy including aluminum.
6. The cooking utensil of claim 5, said surface being hard anodized.
7. The cooking utensil of claim 1, the coating further including an inert colorant.
8. The cooking utensil of claim 7, the colorant being comprised of inert particles.
9. The cooking utensil of claim 8, the inert particles being selected from the group consisting of $TiO_2$, $Fe_2O_3$, and $Fe_3O_4$.
10. The cooking utensil of claim 8, the colorant being white.
11. A metal appliance comprising:
    a cooking utensil having a wall with a metal surface, the wall adapted to be exposed to cooking heat in use of the cooking utensil with foodstuffs; and
    a polyorgano silane coating on said surface, the coating being formed from a solution having essentially only one variety of silane and adapted to prevent sticking of foodstuffs thereon.
12. The cooking utensil of claim 11, the metal surface being comprised of aluminum.
13. The cooking utensil of claim 11, said surface being hard anodized.
14. The cooking utensil of claim 11, the metal surface being comprised of wrought alloy.
15. The cooking utensil of claim 14, the wrought alloy including aluminum.
16. The cooking utensil of claim 15, said surface being hard anodized.
17. The cooking utensil of claim 11, the silane being an organofunctional silane.
18. The cooking utensil of claim 11, the coating further including a visibly perceptible colorant.
19. A method of forming a hard coating on a metal surface of a cooking utensil, which metal surface is adapted to be exposed to cooking heat in use of the cooking utensil with foodstuffs, the method comprising:
    applying a bifunctional trialkoxyalkane silane solution to the surface of the cooking utensil;
    heating the solution to form a hard silane coating on the surface; and
    thereafter exposing the coated metal surface to cooking heat while using the cooking utensil with foodstuffs.
20. The method of claim 19 wherein the silane solution is a single silane.
21. The method of claim 20 further comprising applying the silane solution to the surface and forming the coating without first reacting the solution with a second silane.
22. The method of claim 19 further comprising forming the solution to at least a 5% concentration of silane.
23. The method of claim 19 further comprising forming the solution to at least a 10% concentration of silane.
24. The method of claim 19 further comprising forming the solution to at least a 15% concentration of silane.
25. The method of claim 19 wherein the coating composition comprises BTSE.
26. The method of claim 19 wherein said silane is BTSM.
27. The method of claim 19 further comprising drying the solution on the surface before heating the solution.
28. The method of claim 19 wherein said surface is hard anodized aluminum.
29. The method of claim 19 further comprising providing a colorant in the silane solution whereby the formed coating has a visibly perceptible color corresponding to the colorant.
30. A method of repairing a cooking utensil having a silane coating on a metal surface of the cooking utensil, at least a portion of which is in need of repair due to loss of part of the coating during use of the cooking utensil, the method comprising:
    applying a silane solution to at least said portion of the cooking utensil in need of such repair so as to replace the coating lost during use of the cooking utensil; and heating the solution to form a generally permanent silane coating in at least said portion.

31. The method of claim 30 further comprising obtaining a supply of the silane solution.

32. The method of claim 30 further comprising providing a supply of the silane solution.

* * * * *

UNITED STATES PATENT AND TRADEMARK OFFICE
CERTIFICATE OF CORRECTION

PATENT NO. : 6,509,101 B2
DATED : January 21, 2003
INVENTOR(S) : David C. Fairbourn It is certified that error appears in the above-identified patent and that said Letters Patent is hereby corrected as shown below:

Title page,
Item [56], References Cited, U.S. PATENT DOCUMENTS, add
-- 6,432,191 B2 8/2002  Schutt --
Item [56], References Cited, FOREIGN PATENT DOCUMENTS, add
-- EP 0 424 072 A1 4/1989 --

Column 1,
Line 7, "The present inventions relates to" should read
-- The present invention relates to --
Line 35, "cooking heat, can" should read -- cooking heat can --
Line 53, "carboxylicacids" should read -- carboxylic acids --
Line 55, "Silane coatings for glassware is described" should read -- Silane coatings for glassware are described --
Lines 59-60, "which is simpler" should read -- which are simpler --

Column 2,
Line 1, "permanent, coating" should read -- permanent coating --
Line 36, "which is simpler" should read -- which are simpler --

Column 4,
Line 4, "Bis(trimethoxysilyl Ethane" should read -- Bis(trimethoxysilyl) Ethane --

UNITED STATES PATENT AND TRADEMARK OFFICE
CERTIFICATE OF CORRECTION

PATENT NO. : 6,509,101 B2
DATED : January 21, 2003
INVENTOR(S) : David C. Fairbourn It is certified that error appears in the above-identified patent and that said Letters Patent is hereby corrected as shown below:

<u>Column 5,</u>
Line 16, "is thus provided improved coatings for cooking utensils which is simpler than" should read -- are thus provided improved coatings for cooking utensils which are simpler than --
Line 56, "selected from group consisting of" should read -- selected from the group consisting of --
Line 58, "surface is hard" should read -- surface being hard --

Signed and Sealed this

Thirtieth Day of March, 2004

JON W. DUDAS
*Acting Director of the United States Patent and Trademark Office*